United States Patent
Cousins et al.

(10) Patent No.: US 8,874,337 B2
(45) Date of Patent: Oct. 28, 2014

(54) SYSTEM AND METHOD FOR CONTROLLING LOADS ON A MANUAL TRANSMISSION BASED ON A SELECTED GEAR OF THE MANUAL TRANSMISSION

(75) Inventors: William L. Cousins, Ortonville, MI (US); James M. Partyka, Clarkston, MI (US)

(73) Assignee: GM Global Technology Operations LLC

( * ) Notice: Subject to any disclaimer, the term of this patent is extended or adjusted under 35 U.S.C. 154(b) by 211 days.

(21) Appl. No.: 13/225,997

(22) Filed: Sep. 6, 2011

(65) Prior Publication Data

US 2013/0060436 A1    Mar. 7, 2013

(51) Int. Cl.
 *G06F 19/00* (2011.01)
 *B60W 10/06* (2006.01)
 *F16H 59/36* (2006.01)

(52) U.S. Cl.
 CPC .............. *B60W 10/06* (2013.01); *F16H 59/36* (2013.01)
 USPC ................................. 701/64; 701/51; 701/55

(58) Field of Classification Search
 CPC ......... F16H 63/42; F16H 59/44; F16H 59/70; F16H 2063/246; F16H 2059/366
 USPC ................... 704/64; 477/110; 701/64, 51, 55; 74/473
 See application file for complete search history.

(56) References Cited

U.S. PATENT DOCUMENTS

| | | | |
|---|---|---|---|
| 4,371,051 A | 2/1983 | Achterholt | |
| 4,488,455 A | 12/1984 | Shetler et al. | |
| 4,622,637 A | 11/1986 | Tomita et al. | |
| 4,701,852 A | 10/1987 | Ulveland | |
| 4,723,215 A | 2/1988 | Hibino et al. | |
| 4,752,883 A | 6/1988 | Asakura et al. | |
| 5,020,361 A | 6/1991 | Malecki et al. | |
| 5,797,110 A * | 8/1998 | Braun et al. | 701/84 |
| 5,941,922 A | 8/1999 | Price et al. | |
| 6,145,398 A * | 11/2000 | Bansbach et al. | 74/335 |
| 6,364,810 B1 | 4/2002 | Hughes | |
| 6,367,344 B1 | 4/2002 | Vogt et al. | |
| 6,382,045 B1 | 5/2002 | Wheeler | |
| 6,550,351 B1 | 4/2003 | O'Reilly et al. | |
| 6,658,960 B2 * | 12/2003 | Babin et al. | 74/473.28 |
| 7,051,609 B2 * | 5/2006 | Zimmermann et al. | 74/335 |
| 7,449,878 B2 | 11/2008 | Lee | |

(Continued)

FOREIGN PATENT DOCUMENTS

DE    3823384 A1    1/1990
DE    19908036 A1   8/2000

(Continued)

OTHER PUBLICATIONS

U.S. Appl. No. 61/425,626, filed Dec. 21, 2010, Benson et al.

(Continued)

*Primary Examiner* — Khoi Tran
*Assistant Examiner* — Robert Nguyen

(57) ABSTRACT

A system according to the principles of the present disclosure includes a selected gear module and a shift indicator module. The selected gear module determines a selected gear of a manual transmission. The shift indicator module monitors vehicle speed and the selected gear and generates a shift indicator signal based on the vehicle speed and the selected gear, the shift indicator signal indicating when to shift to one of first gear and reverse gear.

18 Claims, 5 Drawing Sheets

(56) References Cited

U.S. PATENT DOCUMENTS

| | | |
|---|---|---|
| 7,668,630 B2 | 2/2010 | Weber et al. |
| 8,521,376 B2 * | 8/2013 | Katrak et al. ............... 701/51 |
| 2003/0056614 A1 * | 3/2003 | Babin et al. ............. 74/473.28 |
| 2003/0159534 A1 * | 8/2003 | Babin et al. ............. 74/473.12 |
| 2004/0024513 A1 * | 2/2004 | Aizawa et al. ................ 701/70 |
| 2004/0104719 A1 | 6/2004 | Johnson et al. |
| 2008/0064567 A1 * | 3/2008 | Kue et al. .................... 477/109 |
| 2008/0074104 A1 | 3/2008 | Sauer et al. |
| 2008/0078604 A1 | 4/2008 | Ersoy et al. |
| 2010/0024768 A1 | 2/2010 | Ota et al. |
| 2010/0312442 A1 * | 12/2010 | Ahn ............................. 701/64 |
| 2011/0035121 A1 * | 2/2011 | Katrak et al. ............... 701/51 |
| 2011/0035123 A1 * | 2/2011 | Katrak et al. ............... 701/55 |
| 2012/0152049 A1 | 6/2012 | Benson et al. |
| 2012/0158270 A1 | 6/2012 | Bur et al. |
| 2012/0187940 A1 * | 7/2012 | Uhlenbruck ............ 324/207.11 |
| 2013/0080001 A1 | 3/2013 | Cousins et al. |
| 2013/0300403 A1 | 11/2013 | Benson et al. |

FOREIGN PATENT DOCUMENTS

| | | |
|---|---|---|
| DE | 19924995 A1 | 12/2000 |
| DE | 10308748 A1 | 12/2003 |
| DE | 10333931 A1 | 2/2005 |
| DE | 102007032996 A1 | 2/2008 |
| DE | 102007045443 A1 | 4/2009 |
| DE | 102010002592 A1 | 9/2010 |
| DE | 102009054239 A1 | 5/2011 |
| DE | 102009053873 A1 * | 6/2011 |
| EP | 1059189 A2 * | 12/2000 |
| EP | 1930631 A2 * | 6/2008 |
| GB | 2466040 A | 6/2010 |
| ID | 10310831 A1 | 11/2003 |
| WO | WO-2005009770 A1 | 2/2005 |
| WO | WO-2011061223 A1 | 5/2011 |

OTHER PUBLICATIONS

Schwenger, Andreas; English abstract of Dissertation (p. 5), "Active Damping of Driveline Oscillations", 160 total pages, Jul. 1970.

* cited by examiner

SYSTEM AND METHOD FOR CONTROLLING LOADS ON A MANUAL TRANSMISSION BASED ON A SELECTED GEAR OF THE MANUAL TRANSMISSION

FIELD

The present disclosure relates to systems and methods for controlling loads on a manual transmission based on a selected gear of the manual transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A manual transmission typically includes different gears (e.g., first, second) that are engaged to transfer torque from an engine to a driveline at different gear ratios. To shift a manual transmission, a driver depresses a clutch pedal to disengage a clutch and thereby decouple the transmission from the engine. The driver then manipulates a gear selector to select a different gear and releases the clutch to reengage the engine and the transmission.

Some vehicles equipped with a manual transmission may include a dual mass flywheel. A dual mass flywheel includes a damper, such as a series of springs, to minimize driveline vibrations that may cause undesirable noise and/or damage components of the manual transmission. The dual mass flywheel is attached to and rotates with a crankshaft of an engine, and a clutch engages the dual mass flywheel to couple the engine and a transmission.

SUMMARY

A system according to the principles of the present disclosure includes a selected gear module and a shift indicator module. The selected gear module determines a selected gear of a manual transmission. The shift indicator module monitors vehicle speed and the selected gear and generates a shift indicator signal based on the vehicle speed and the selected gear, the shift indicator signal indicating when to shift to one of first gear and reverse gear.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
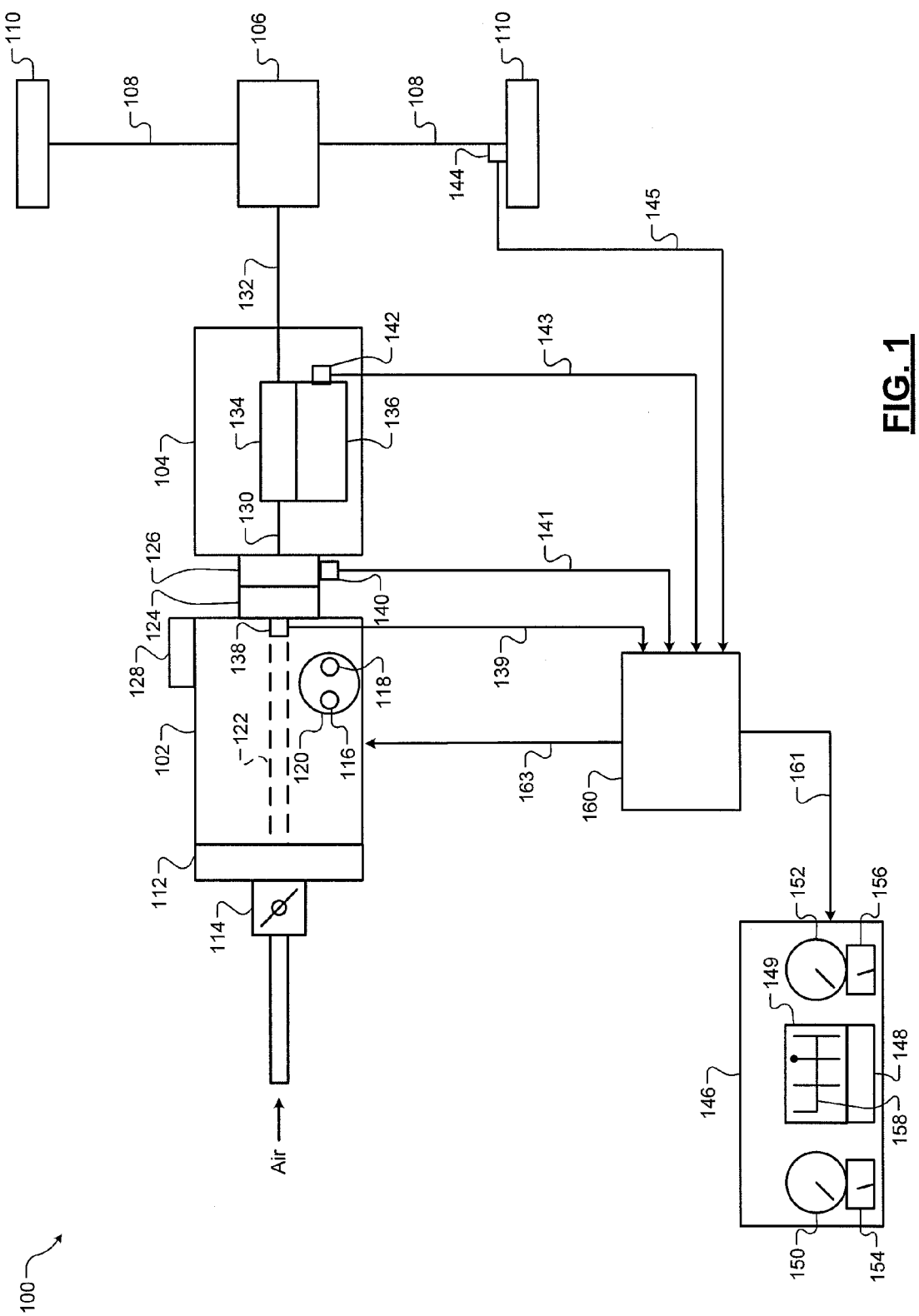
FIG. 1 is a functional block diagram of an example vehicle system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

To avoid damaging a clutch, a vehicle equipped with a manual transmission may be shifted to first or reverse before the vehicle is launched (i.e., accelerated from zero). If the vehicle is launched in a gear other than first or reverse, the amount of energy absorbed by a clutch may be several times greater than the amount of energy absorbed by the clutch when the vehicle is launched in first or reverse. In turn, the life of the clutch may be reduced. For example, the life of the clutch may be reduced by 1,000 miles or more each time the vehicle is launched in a gear other than first or reverse.

A system and method according to the present disclosure prevents damage to a clutch by instructing a driver to shift gears when a vehicle is stopped in a gear other than first, reverse, or neutral or when a vehicle starts to launch in a gear other than first or reverse. A selector position sensor detects the position of a gear selector, and a selected gear is determined based on the selector position. A visual message, an audible message, and/or a tactile message are used to instruct the driver to shift gears. The driver may be instructed to shift to first or reverse when the vehicle speed is less than or equal to a predetermined speed, such as zero, and the selected gear is not first, reverse, or neutral. The driver may be instructed to shift to first or reverse when the vehicle speed increases from zero to greater than or equal to a predetermined speed, such as 3 kilometers per hour (kph), and the selected gear is not first or reverse.

Instructing a driver to shift to first or reverse before the driver launches a vehicle in a gear other than first or reverse decreases the operating temperature of a clutch. Decreasing the operating temperature of the clutch improves the life and performance of all components in the clutch, including a clutch disc, a clutch pressure plate, a self-adjusting mechanism, and a clutch hydraulic or mechanical release system. Decreasing the operating temperature of the clutch also improves the life and performance of a dual mass flywheel that a clutch engages to couple the transmission to the engine. In addition, odor emitted by the clutch may be prevented or reduced, which may improve customer perception of the quality and robustness of the vehicle.

A system and method according to the present disclosure prevents damage to a manual transmission by limiting torque output of an engine based on a torsional load capacity of the manual transmission. A selector position sensor detects the position of a gear selector, and a selected gear is determined based on the selector position. A torque limit is determined based on the selected gear, and the torque output of the engine is limited to the torque limit while the transmission is in the selected gear. For example, an engine may have a torque output capacity of 400 Newton-meter (Nm), and a 6-speed transmission may have a torque capacity of 400 Nm in second gear through sixth gear and a torque capacity of 350 Nm in first gear. In this example, torque output of the engine may be limited to 350 Nm when the transmission is in first gear.

Limiting the torque output of the engine in this manner enables a transmission to be used with an engine that has a greater torque capacity than the transmission. In turn, a single transmission may be used with several different engine applications. As a result, the cost of the transmission may be reduced through increased production.

Referring to FIG. 1, a functional block diagram of an example vehicle system 100 is presented. The vehicle system 100 includes an engine 102, a transmission 104, a differential 106, driveshafts 108, and drive wheels 110. The engine 102 generates drive torque. While the engine 102 is shown and will be discussed as a spark-ignition internal combustion engine (ICE), the engine 102 may include another suitable type of engine, such as a compression-ignition ICE. One or more electric motors (or motor-generators) may also generate drive torque.

Air is drawn into the engine 102 through an intake manifold 112. Airflow into the engine 102 may be varied using a throttle valve 114. One or more fuel injectors, such as a fuel injector 116, mix fuel with the air to form an air/fuel mixture. A spark plug 118 ignites the air/fuel mixture to combust the air/fuel mixture within cylinders of the engine 102, such as a cylinder 120. Although the engine 102 is depicted as including one cylinder, the engine 102 may include more than one cylinder.

The cylinder 120 includes a piston (not shown) that is mechanically linked to a crankshaft 122. The engine 102 outputs torque to the transmission 104 via the crankshaft 122. A flywheel 124 is attached to and rotates with the crankshaft 122. A clutch 126 engages the flywheel 124 to couple the transmission 104 to the engine 102. The flywheel 124 may be a dual mass flywheel that includes a damper.

One combustion cycle within the cylinder 120 may include four phases: an intake phase, a compression phase, a combustion phase, and an exhaust phase. During the intake phase, the piston moves toward a bottommost position and draws air into the cylinder 120. During the compression phase, the piston moves toward a topmost position and compresses the air or air/fuel mixture within the cylinder 120.

During the combustion phase, spark from the spark plug 118 ignites the air/fuel mixture. The combustion of the air/fuel mixture drives the piston back toward the bottommost position, and the piston drives rotation of the crankshaft 122. Resulting exhaust gas is expelled from the cylinder 120 through an exhaust manifold 128 to complete the exhaust phase and the combustion event.

The transmission 104 transfers drive torque from the engine 102 to the differential 106 at a gear ratio corresponding to a selected gear. The transmission 104 includes an input shaft 130, an output shaft 132, and gears 134. The input shaft 130 couples the clutch 126 and the gears 134. The output shaft 132 couples the gears 134 and the differential 106. The gears 134 transmit torque from the input shaft 130 to the output shaft 132 at various gear ratios. The gears 134 include a reverse gear, a first gear, and one or more higher gears that are higher than first gear. A gear selector 136 is manipulated by a driver to select one of the gears 134 to achieve a desired gear ratio. An example of a gear selector is discussed below with reference to FIGS. 2 and 3. The differential 106 transfers drive torque from the output shaft 132 to the driveshafts 108. The driveshafts 108 couple the differential 106 to the drive wheels 110.

The vehicle system 100 includes sensors that measure operating conditions of the vehicle system 100. A crankshaft position sensor 138 measures the position of the crankshaft 122 and generates a crankshaft position signal 139 indicating the crankshaft position. The crankshaft position may be used to determine engine speed. A clutch position sensor 140 measures the position of the clutch 126 and generates a clutch position signal 141 indicating the clutch position. The clutch position may be used to determine whether the clutch 126 is engaged and/or the degree of engagement.

A selector position sensor 142 determines the position of the gear selector 136 and generates a selector position signal 143 indicating the selector position. The selector position may be used to determine the selected gear, which may be one of the gears 134 or neutral. Examples of selector position sensors are discussed below with reference to FIGS. 2 and 3. A wheel speed sensor 144 measures the speed of the drive wheels 110 and generates a wheel speed signal 145 indicating the wheel speed. The wheel speed may be used to determine vehicle speed.

The vehicle system 100 includes a driver interface 146 that relays information to the driver. The driver interface 146 includes a shift indicator 148. For illustration purposes only, the driver interface 146 is depicted as also including a gear indicator 149, a speedometer 150, a tachometer 152, a temperature gauge 154, and a fuel gauge 156. The gear indicator 149 indicates the selected gear by displaying the selected gear and/or the position of the gear selector 136 relative to a shift pattern 158. The shift indicator 148 delivers a visual message (e.g., text), an audible message (e.g., chime), and/or a tactile message (e.g., vibration) instructing the driver to shift to first or reverse.

A control module 160 controls the engine 102 and the driver interface 146. The control module 160 outputs a shift indicator signal 161 indicating when to shift to first or reverse.

The shift indicator 148 instructs the driver to shift to first or reverse in response to the shift indicator signal 161. The control module 160 outputs the shift indicator signal 161 when the vehicle speed is zero and the selected gear is not first, reverse, or neutral, or when the vehicle speed increases from zero and the selected gear is not first or reverse. The control module 160 determines the selected gear based on the selector position and determines the vehicle speed based on the wheel speed.

The control module 160 limits the output torque of the engine 102 based on the torsional load capacity of the transmission 104. The control module 160 determines a torque limit based on the selected gear. The torque limit may be predetermined for each of the gears 134 based on the design (e.g., material, geometry) of the gears 134. The control module 160 maintains the torque output of the engine 102 at or less than the torque limit by outputting an engine control signal 163.

Figure 2:
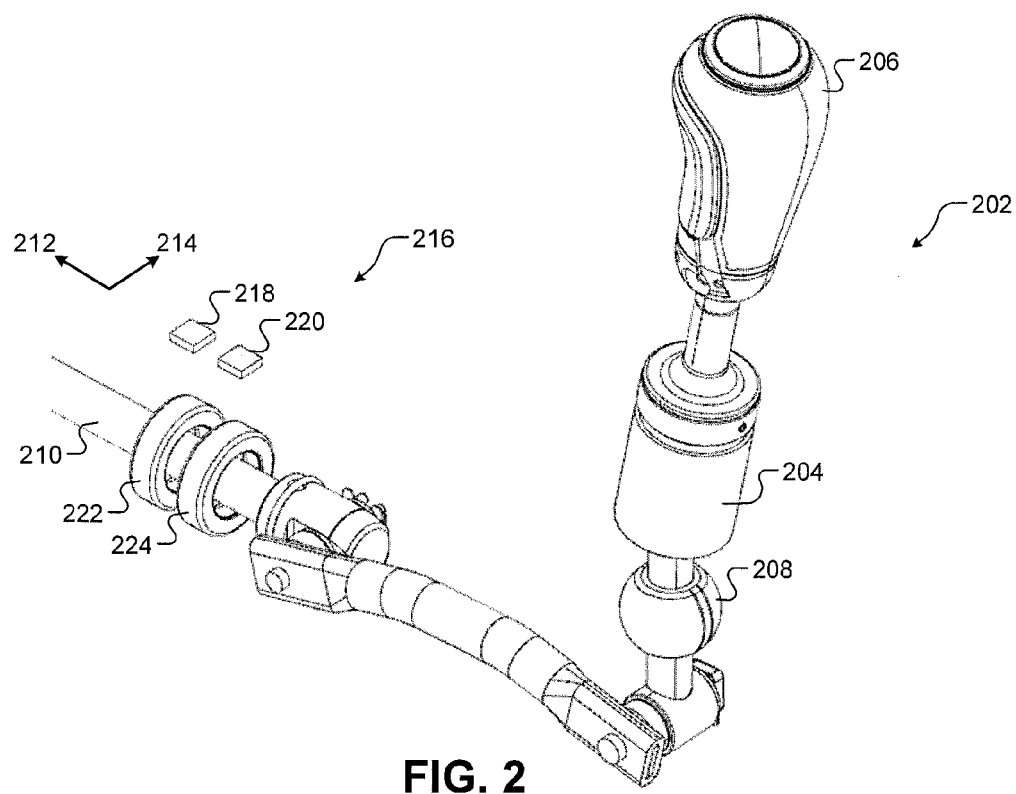
FIGS. 2 and 3 are perspective views of an example gear selector and example selector position sensors according to the principles of the present disclosure.

Referring to FIG. 2, a gear selector 202 includes a shift lever 204 that terminates in a shift handle 206. A driver moves the shift lever 204 through a shift pattern, such as the shift pattern 158 shown in FIG. 1, to shift gears. The shift lever 204 is disposed in a ball pivot 208 and coupled to a shaft 210 oriented along a longitudinal axis 212. Moving the shift lever 204 in the direction of the longitudinal axis 212 translates the shaft 210 along the longitudinal axis 212. Moving the shift lever 204 in the direction of a lateral axis 214 rotates the shaft 210 about the longitudinal axis 212.

A selector position sensor 216 includes a first sensor 218, a second sensor 220, a first magnet 222, and a second magnet 224. The first magnet 222 and the second magnet 224 are attached to the shaft 210. The first sensor 218 and the second sensor 220 are one-dimensional Hall effect sensors mounted proximate to the first magnet 222 and the second magnet 224. The output voltages or duty cycles of the first sensor 218 and the second sensor 220 vary in response to the magnetic fields of the first magnet 222 and the second magnet 224 as the shaft 210 is translated or rotated relative to the longitudinal axis 212. In this regard, the first sensor 218 and the second sensor 220 detect the proximity of the first magnet 222 and the second magnet 224, and their duty cycles may be used to determine the position of the gear selector 202.

Figure 3:
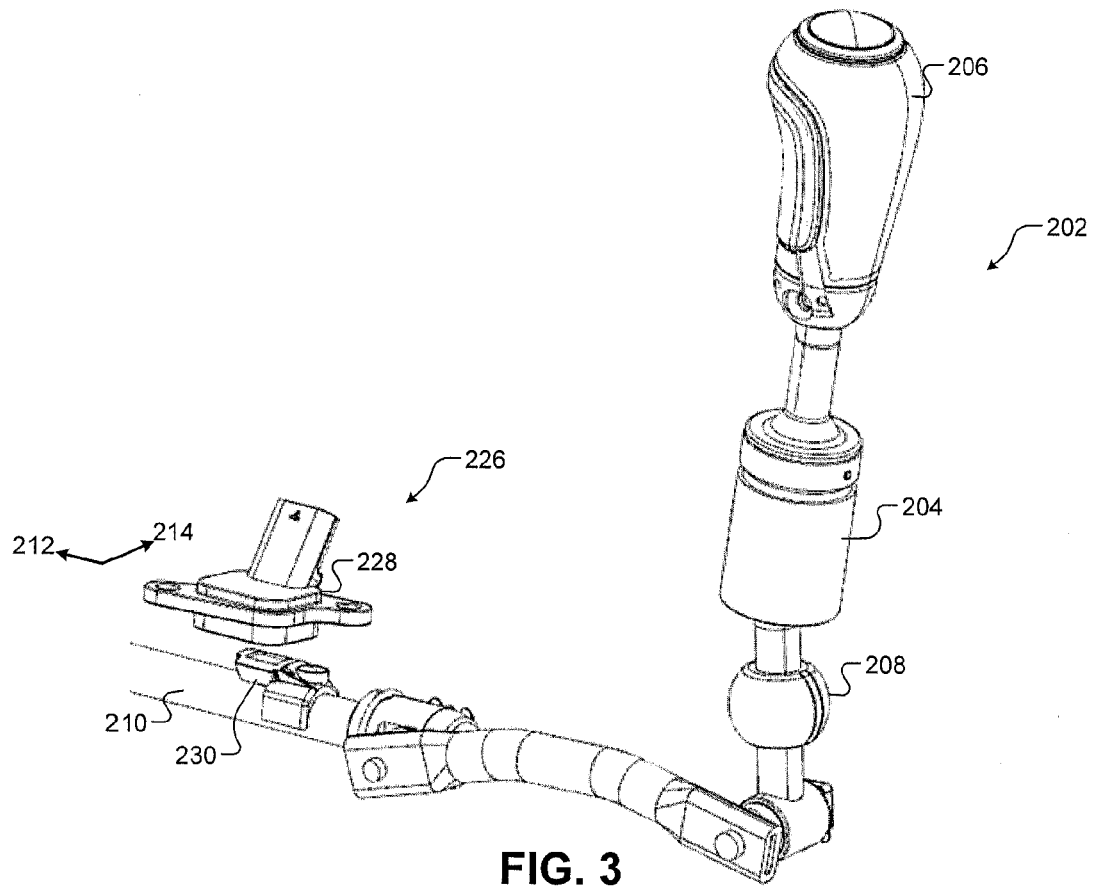

Referring to FIG. 3, a selector position sensor 226 includes a sensor 228 and a magnet 230. The magnet 230 is attached to the shaft 210. The sensor 228 is a three-dimensional Hall effect sensor mounted proximate to the magnet 230. The output voltage or duty cycle of the sensor 228 varies in response to the magnetic field of the magnet 230 as the shaft 210 is translated or rotated relative to the longitudinal axis 212. In this regard, the sensor 228 detects the proximity of the magnet 230, and the duty cycle of the sensor 228 may be used to determine the position of the gear selector 202.

Figure 4:
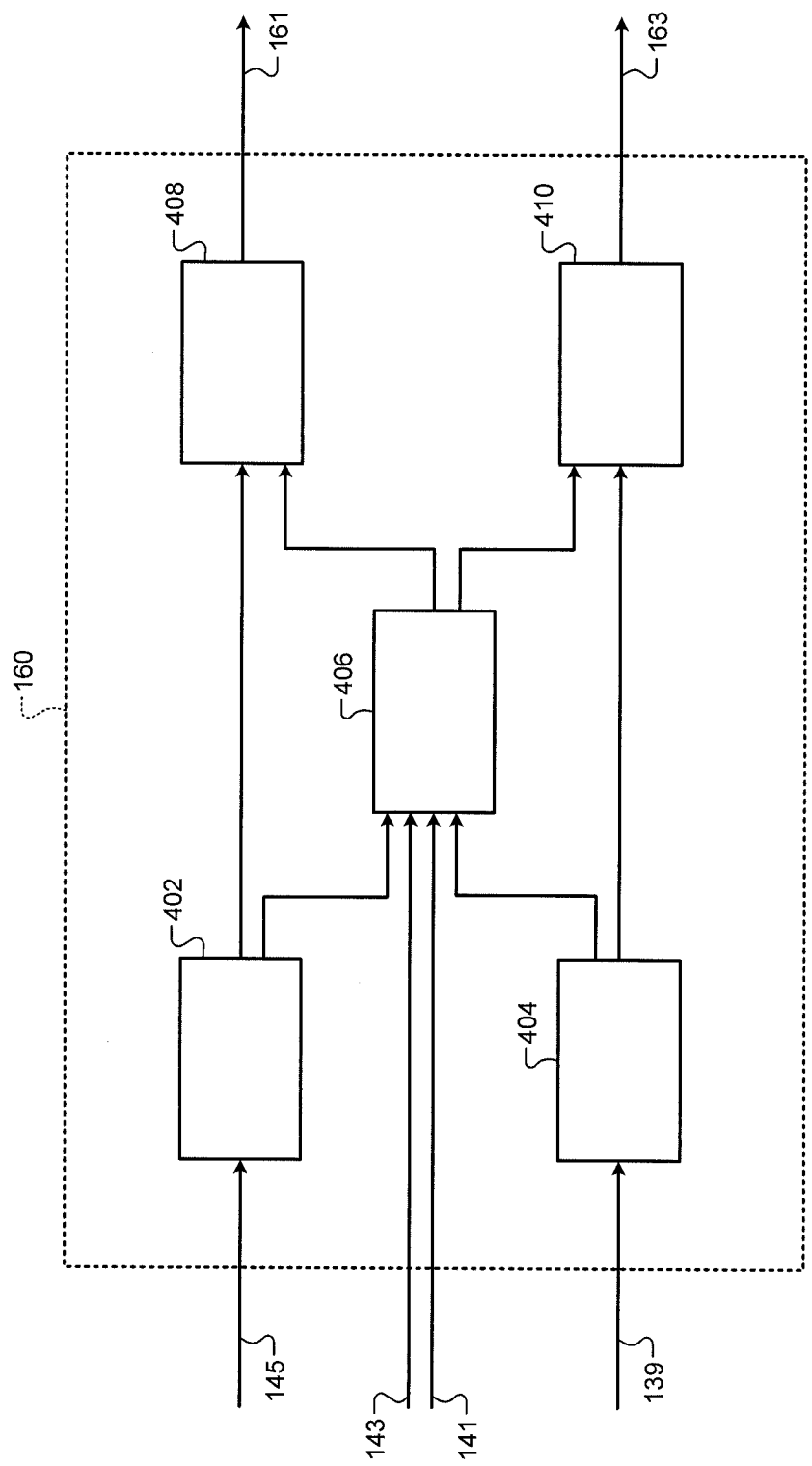
FIG. 4 is a functional block diagram of an example control module according to the principles of the present disclosure.

Referring to FIG. 4, an example of the control module 160 of FIG. 1 includes a vehicle speed module 402, an engine speed module 404, a selected gear module 406, a shift indicator module 408, and a torque limit module 410. The vehicle speed module 402 determines vehicle speed based on wheel speed. The vehicle speed module 402 outputs the vehicle speed. The engine speed module 404 determines engine speed based on the crankshaft position. The engine speed module 404 outputs the engine speed.

The selected gear module 406 determines the selected gear. The selected gear module 406 may determine the selected gear based on the selector position. Additionally, the selected gear module 406 may determine the selected gear based on the vehicle speed, the engine speed, and the clutch position. The selected gear may be determined based on the ratio of the engine speed to the vehicle speed when the clutch position indicates that the clutch 126 is fully engaged and the vehicle speed is greater than zero. The selected gear module 406 may also determine the selected gear based on predetermined parameters such as wheel size and axle ratio. The selected gear module 406 outputs the selected gear.

The shift indicator module 408 outputs the shift indicator signal 161 indicating when to shift to first or reverse. The shift indicator module 408 may output the shift indicator signal 161 when the vehicle speed is less than or equal to a first speed (e.g., zero) and the selected gear is not first, reverse, or neutral. The shift indicator module 408 may refrain from outputting the shift indicator signal 161 when the aforementioned condition is satisfied for less than a first period and/or when a clutch pedal engagement is less than a first percent (e.g., 10 percent). The shift indicator module 408 may activate the shift indicator 148 when the vehicle speed increases from the first speed to a second speed (e.g., 3 kph) and the selected gear is not first or reverse. The first speed, the second speed, the first percent, and the first period may be predetermined.

The torque limit module 410 limits the output torque of the engine 102 by outputting the engine control signal 163. The torque limit module 410 determines a torque limit based on the selected gear. The torque limit may be predetermined for each of the gears 134 based on the design (e.g., material, geometry) of the gears 134. The torque limit module 410 maintains the output torque of the engine 102 at or below the torque limit.

Figure 5:
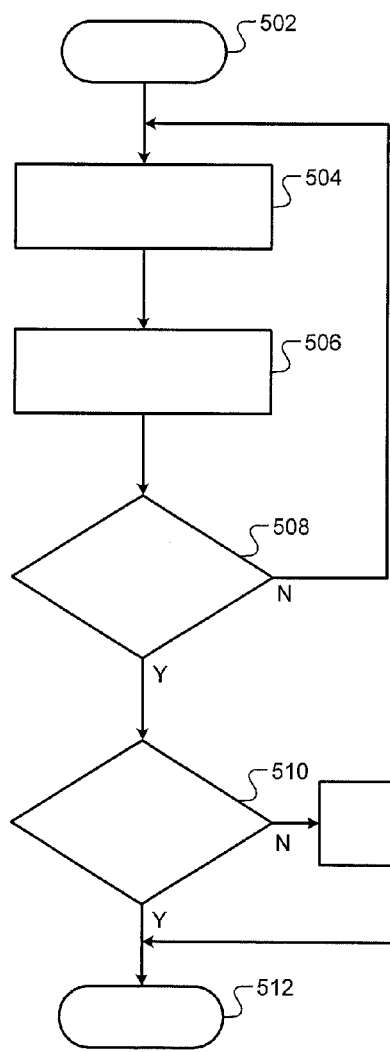
FIGS. 5, 6, and 7 are flowcharts illustrating example control methods according to the principles of the present disclosure.

Referring to FIG. 5, a method for protecting a clutch by instructing a driver to shift a manual transmission when a vehicle is stopped in a higher gear begins at 502. At 504, the method determines a vehicle speed. At 506, the method determines a selected gear. The method may determine the selected gear based on a position of a gear selector measured by a selector position sensor. When the clutch is fully engaged and the vehicle speed is greater than zero, the method may determine the selected gear based on a ratio of an engine speed to the vehicle speed.

At 508, the method determines whether the vehicle speed is less than or equal to a first speed (e.g., zero). The first speed may be predetermined to correspond to a vehicle stop or coast. If the vehicle speed is less than or equal to the first speed, the method continues at 510. Otherwise, the method continues at 504.

At 510, the method determines whether the selected gear is first, reverse, or neutral. If the selected gear is first, reverse, or neutral, the method ends at 512. Otherwise, the method continues at 514. At 514, the method generates a shift indicator signal indicating when to shift to first or reverse. In turn, a shift indicator delivers a visual message (e.g., text), an audible message (e.g., chime), and/or a tactile message (e.g., vibration) instructing the driver to shift to first or reverse. The method may continue to instruct the driver to shift until the selected gear is first or reverse.

Figure 6:
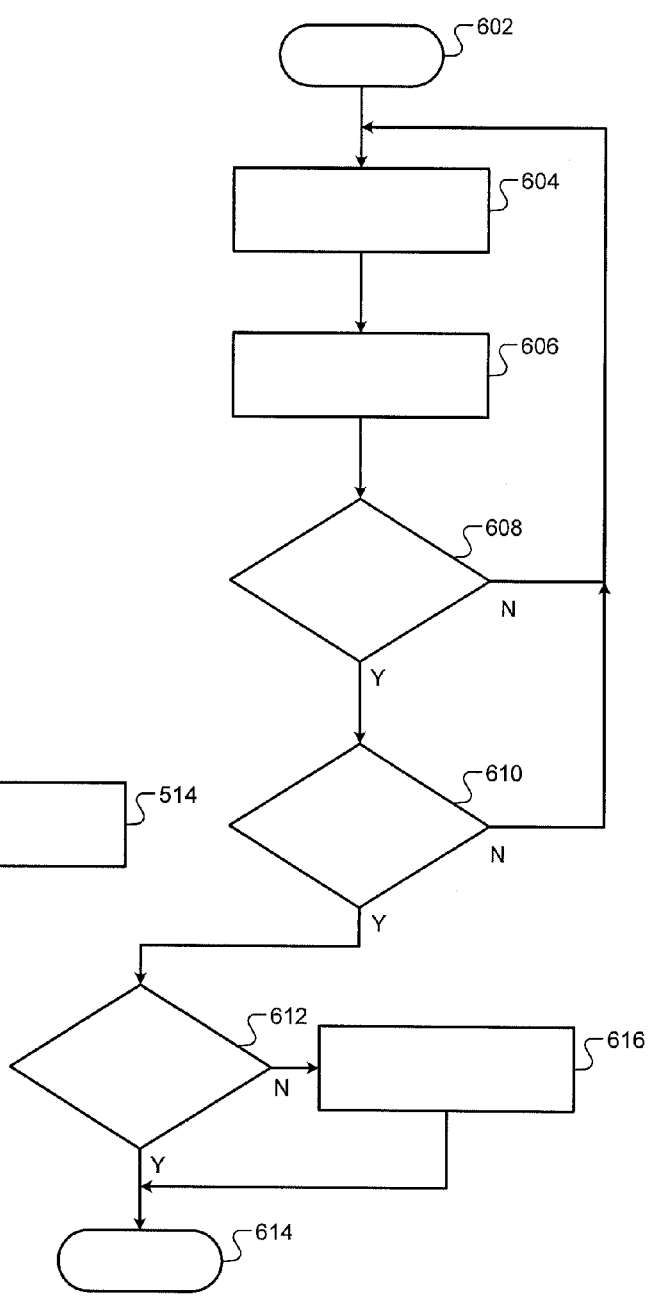

Referring to FIG. 6, a method for protecting a clutch by instructing a driver to shift a manual transmission as a vehicle starts to launch in a higher gear begins at 602. At 604, the method determines a vehicle speed. At 606, the method determines a selected gear. The method may determine the selected gear based on a position of a gear selector measured by a selector position sensor. When the clutch is fully engaged and the vehicle speed is greater than zero, the method may determine the selected gear based on a ratio of an engine speed to the vehicle speed.

At 608, the method determines whether the vehicle speed is less than or equal to a first speed (e.g., zero). The first speed may be predetermined to correspond to a vehicle stop or coast. If the vehicle speed is less than or equal to the first speed, the method continues at 610. Otherwise, the method continues at 604.

At 610, the method determines whether the vehicle speed is greater than or equal to a second speed (e.g., 3 kph). The second speed may be predetermined to correspond to a vehicle launch. If the vehicle speed is greater than or equal to the second speed, the method continues at 612. Otherwise, the method continues at 604.

At 612, the method determines whether the selected gear is first or reverse. If the selected gear is first or reverse, the method ends at 614. Otherwise, the method continues at 616. At 616, the method generates a shift indicator signal indicating when to shift to first or reverse. In turn, a shift indicator delivers a visual message (e.g., text), an audible message (e.g., chime), and/or a tactile message (e.g., vibration) instructing the driver to shift to first or reverse. The method may continue to instruct the driver to shift until the selected gear is first or reverse.

Figure 7:
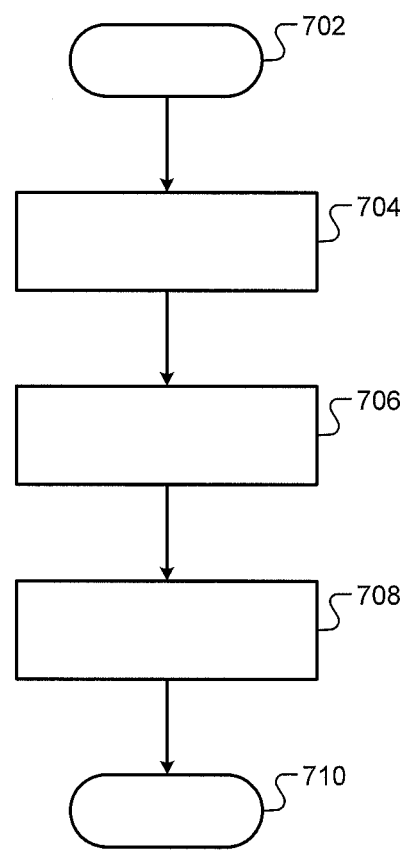

Referring to FIG. 7, a method for limiting torque output of an engine based on a torsional load capacity of a manual transmission begins at 702. At 704, the method determines a selected gear. The method may determine the selected gear based on a position of a gear selector measured by a selector position sensor. When the clutch is fully engaged and the vehicle speed is greater than zero, the method may determine the selected gear based on a ratio of an engine speed to the vehicle speed.

At 706, the method determines a torque limit based on the selected gear. The torque limit may be predetermined for each gear in the manual transmission. For example, the torque limit may be set to 350 Nm when the selected gear is first and the torque limit may be set to 400 Nm when the selected gear is higher than first. At 708, the method controls the engine based on the torque limit, for example, by maintaining the torque output of the engine at or less than the torque limit. The method ends at 710.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   generating a signal indicating a degree of clutch engagement;
   wherein a degree of clutch pedal engagement corresponds to the degree of clutch engagement;
   generating a shift indicator signal based on the degree of clutch pedal engagement, the shift indicator signal indicating when to shift gears of a manual transmission;
   wherein the shift indicator signal is an electronic signal; and
   refraining from generating the shift indicator signal when the degree of clutch pedal engagement is less than a predetermined percent.

2. A clutch position sensor that generates a clutch position signal indicating a degree of clutch engagement,
   wherein a degree of clutch pedal engagement corresponds to the degree of clutch engagement; and
   a shift indicator module that generates a shift indicator signal based on the degree of clutch pedal engagement, the shift indicator signal indicating when to shift gears of a manual transmission,
   wherein the shift indicator module refrains from generating the shift indicator signal when the degree of clutch pedal engagement is less than a predetermined percent.

3. A method comprising:
   determining a selected gear of a manual transmission based on a measured position of a gear selector; and
   monitoring vehicle speed and the selected gear; and
   generating a shift indicator signal based on the vehicle speed and the selected gear when a clutch of the manual transmission is at least partially disengaged, the shift indicator signal indicating when to shift to one of first gear and reverse gear.

4. The method of claim 3, further comprising determining the selected gear based on clutch position, engine speed, and the vehicle speed when the clutch is fully engaged and the vehicle speed is greater than zero.

5. The method of claim 3, further comprising selectively generating the shift indicator signal when a first condition is satisfied, wherein the first condition is satisfied when the selected gear is higher than the first gear and the vehicle speed is less than or equal to a predetermined speed.

6. The method of claim 3, further comprising generating the shift indicator signal when the selected gear is higher than the first gear and the vehicle speed increases from zero to greater than or equal to a predetermined speed.

7. The method of claim 3, wherein the shift indicator signal prompts at least one of a visual message, an audible message, and a tactile message indicating when to shift.

8. The method of claim 3, further comprising measuring the position of the gear selector using at least two Hall effect sensors and at least two magnets.

9. The method of claim 5, wherein the predetermined speed is zero.

10. The method of claim 5, further comprising refraining from generating the shift indicator signal when the first condition is satisfied for a period that is less than a predetermined period.

11. A system comprising:
    a selected gear module that determines a selected gear of a manual transmission based on a measured position of a gear selector; and
    a shift indicator module that monitors vehicle speed and the selected gear and that generates a shift indicator signal based on the vehicle speed and the selected gear when a clutch of the manual transmission is at least partially disengaged, the shift indicator signal indicating when to shift to one of first gear and reverse gear.

12. The system of claim 11, wherein the selected gear module determines the selected gear based on clutch position, engine speed, and the vehicle speed when the clutch is fully engaged and the vehicle speed is greater than zero.

13. The system of claim 11, wherein:
    the shift indicator module selectively generates the shift indicator signal when a first condition is satisfied; and
    the first condition is satisfied when the selected gear is higher than the first gear and the vehicle speed is less than or equal to a predetermined speed.

14. The system of claim 11, wherein the shift indicator module generates the shift indicator signal when the selected gear is higher than the first gear and the vehicle speed increases from zero to greater than or equal to a predetermined speed.

15. The system of claim 11, wherein the shift indicator signal prompts at least one of a visual message, an audible message, and a tactile message indicating when to shift.

16. The system of claim 11, further comprising at least two magnets and at least two Hall effect sensors that measure the position of the gear selector based on magnetic fields of the at least two magnets.

17. The system of claim 13, wherein the predetermined speed is zero.

18. The system of claim 13, wherein the shift indicator module refrains from generating the shift indicator signal when the first condition is satisfied for a period that is less than a predetermined period.

* * * * *